April 28, 1931.  R. W. CANFIELD  1,803,001
METHOD AND APPARATUS FOR BLOWING HOLLOW GLASSWARE
Filed Oct. 20, 1925
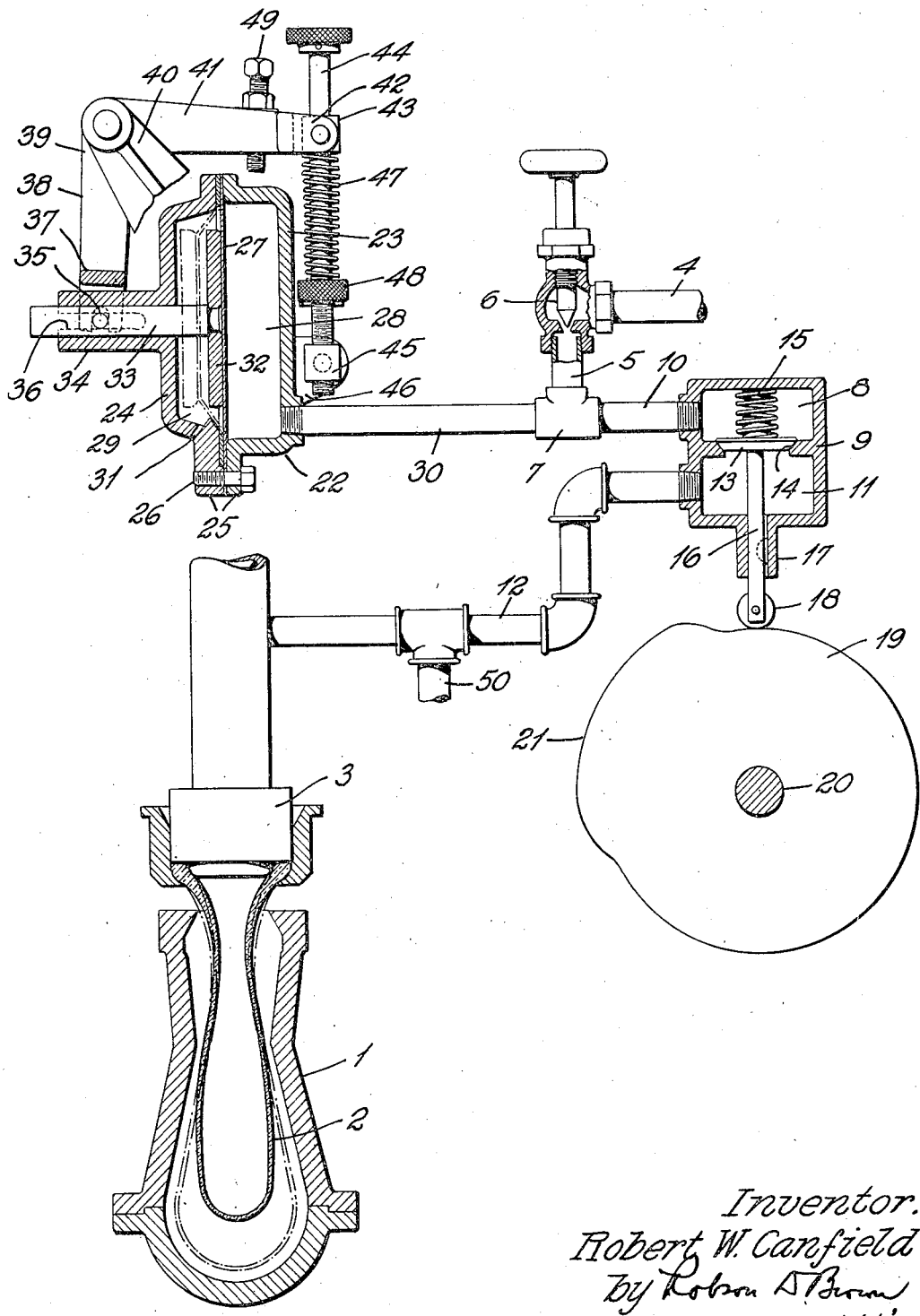
Inventor:
Robert W. Canfield
by Robson A Brown
Atty.

Patented Apr. 28, 1931

1,803,001

UNITED STATES PATENT OFFICE

ROBERT W. CANFIELD, OF WEST HARTFORD, CONNECTICUT, ASSIGNOR TO HARTFORD-EMPIRE COMPANY, OF HARTFORD, CONNECTICUT, A CORPORATION OF DELAWARE

METHOD AND APPARATUS FOR BLOWING HOLLOW GLASSWARE

Application filed October 20, 1925. Serial No. 63,664.

This invention relates to a method of and apparatus for blowing hollow glassware and it has particular relation to the manufacture of electric lamp bulbs.

Heretofore, in the manufacture of electric lamp bulbs, it has been the practice to blow the blank or parison to final form in the finishing mold by a steady and uniform blowing pressure. It has been observed, however, that in this method the parison elongates under the action of gravity at a greater rate than it expands laterally, with the result that the bottom end of the parison contacts with the lower portion of the mold before the sides of the parison are blown into contact with the sides of the mold. This not only results in uneven chilling and wall thickness, but the rotary motion of the parison causes it to twist and produce the wavy marking frequently observed in the lower or bulbous portion of electric lamp bulbs.

One of the objects of the present invention is to avoid the difficulties hereinabove mentioned by providing a method of blowing a parison which consists in inaugurating the finishing blowing operation with a quick puff or volume of air delivered at a relatively high rate of flow which expands the parison into a bulbous shape approximating that of the mold, and then concluding the final blowing operation with a steady flow of air delivered at a decreased rate of flow which expands all portions of the parison into contact with the walls of the mold substantially simultaneously.

Another object of the invention is to provide a device for automatically delivering an initial puff of blowing air to a parison followed by a steady flow of blowing air at decreased rate of flow and which may be readily adjusted to control the volume and rate of flow of the air according to the size and type of ware being produced.

The single figure of the accompanying drawing is a vertical sectional view through a blow mold and parison and the device for controlling the application of blowing pressure thereto.

Referring to the drawing, a blow mold 1 is shown as occupying a closed position about a partially blown parison 2 which is suspended from a blowhead 3. Blowing air is supplied to the blowhead from a pipe 4 which leads to a suitable source of air under pressure and which communicates with a pipe 5 through a regulating needle-valve 6. The pipe 5 communicates with a T 7 which in turn communicates with a chamber 8 of a poppet-valve casing 9 through a pipe 10. A chamber 11 is also provided within the casing 9 and communicates with the blowhead 3 through a pipe 12. Communication between the chambers 8 and 11 is established and disestablished at predetermined intervals by means of a poppet-valve 13 which is yieldably urged into engagement with a seat 14 by a spring 15. The valve 13 is provided with a stem 16 which is splined in a slide bearing 17 and which is provided at its lower extremity with a roller 18 for engagement with a constantly rotating cam 19. This cam is mounted on a shaft 20 and is provided with a cam lobe 21 which is adapted to engage the roller 18 and lift the valve 13 against the action of the spring 15, to establish communication between the blowhead 3 and its source of blowing air.

The puff-blow mechanism which delivers an initial volume of air at a relatively rapid rate of flow to the parison before the steady finish-blowing pressure is applied, includes a casing 22 which comprises two substantially complementary cup-shaped members 23 and 24. These members are provided with peripheral flanges 25 which are bolted together, as at 26, and between which a flexible diaphragm 27 is clamped. This diaphragm divides the interior of the casing 22 into two compartments 28 and 29, the former communicating with the T 7 and the source of blowing air through a pipe 30, and the latter communicating with the outer atmosphere through a port 31.

A plate 32 rests against the rear face of the diaphragm 27 and is provided with a stem 33 which is slidably mounted in a bearing 34 formed on the member 24. A pin 35 extends transversely through the stem 33 and through slots 36 formed in the bearing 34 and is engaged by a slotted yoke portion 37 of a downwardly extending arm 38 of a bell crank lever 39. This lever is pivotally mounted between ears 40 formed on the member 24 and its other arm 41 extends horizontally over the casing 22 and terminates in a forked extremity 42 in which a block 43 is pivotally mounted. The block 43 is slidably mounted on a screw 44 which is threaded into a block 45 which is pivotally mounted on an ear 46 formed on the member 23. A coiled spring 47 surrounds the screw 44 between the block 43 and a nut 48 which is threaded onto the screw 44. By turning the screw 44 in the block 45, the vertical position of the nut 48 may be adjusted, thereby increasing or decreasing the compression of the spring 47 and the resistance of the diaphragm 27 to air pressure in the chamber 28, thereby regulating the rate at which the air is expelled from the chamber 28 to the parison 2 on the initial puff.

The volume of the air initially delivered to the parison is regulated by a stop screw 49 which is threaded into the arm 41 of the bell crank lever 39 for engagement with the casing 22. By suitably adjusting this screw the throw of the lever 39 and the displacement of the diaphragm 27 may be regulated to vary the volume of air first delivered to the parison according to the particular requirements of the ware being produced.

In operation, the parison is first partially blown by air introduced to the blowhead through a pipe 50 and may be further shaped in any suitable manner, such as, for example, by the method described in my copending applications Ser. No. 14,674, filed March 11, 1925 and Ser. No. 31,315, filed May 19, 1925.

During the time that the parison is being thus shaped, the valve 13 has been occupying a closed position, interrupting communication between the source of blowing air and the blowhead 3 and causing a volume of air to accumulate under pressure in the chamber 28 which forces the diaphragm into the position shown by dotted lines against the action of the spring 47. As soon, however, as the parison has sagged or elongated sufficiently, the mold 1 is closed about it and the rotation of the cam 19 carries the lobe 21 into contact with the roller 18, elevating the valve 13 against the action of the spring 15. This opening movement of the valve 13 occurs rapidly, owing to the quick rise of the cam lobe 21, and permits the air accumulated in the chamber 28 to be expelled quickly by the diaphragm 27 and spring 47. The air thus released flows through the valve casing 9, pipe 12, blowhead 3 and into the parison, which is quickly expanded into the shape shown by the dotted lines in the drawing. The amount of air which is accumulated in the chamber 28 is equal to that required to expand the parison to the desired size and is determined by the adjustment of the screw 49.

The length of the cam lobe 21 is sufficient to maintain the valve 6 open for a period of time after the rapid expansion of the parison is concluded, thus permitting air at a reduced pressure determined by the adjustment of the valve 6 to flow at a steady rate from the supply pipe 4 to the blowhead 3 and to expand all portions of the parisons into contact with the walls of the mold substantially simultaneously.

It will be observed that the initial contact between the expanding glass and the walls of the mold takes place under comparatively gentle pressure. This is an advantage, because the glass is not rubbed forcibly against the walls of the mold and is, therefore, less likely to be scratched or otherwise marred. As the blowing continues, a back pressure develops and pushes back the diaphragm 27. This decreases the rate of building up of pressure on the glass in the mold. The diaphragm may thus be said to act to retard the building up of pressure within the glass after a predetermined pressure is reached.

It will be understood that the several necessary elements constituting the invention may be varied in proportion and arrangement without departing from the nature and scope of the invention as set forth in the appended claims.

I claim as my invention:

1. The method of blowing hollow glassware which comprises delivering a volume of air to a parison at a relatively rapid rate of flow to expand the parison quickly into a bulbous configuration approximating that of the mold and thereafter delivering a volume of air to the parison at a reduced rate of flow to expand the parison into contact with the walls of the mold.

2. The method of blowing hollow glassware which comprises delivering a volume of air to a parison at a relatively rapid rate of flow to expand the parison quickly into a bulbous configuration approximating that of the mold and into a position adjacent to the walls thereof and thereafter delivering air to the parison at a decreased rate of flow to expand the parison into contact with the walls of the mold.

3. The method of blowing hollow glassware which comprises delivering a predetermined volume of air to a parison at a relatively rapid rate of flow to expand the parison quickly into a bulbous configuration approximating that of the mold and into a position adjacent to the walls thereof and thereafter delivering air to the parison at a decreased rate of flow to expand the parison uniformly into contact with the walls of the mold.

4. The method of blowing hollow glassware which comprises delivering a predetermined volume of air to a parison at a relatively rapid rate of flow to expand the parison into a bulbous configuration approximating that of the mold and into a position adjacent to the walls thereof and thereafter delivering air to the parison at a decreased rate of flow to expand all portions of the parison into contact with the walls of the mold substantially simultaneously, and maintaining the walls of the parison in contact with the walls of the mold by an increasing pressure.

5. The method of blowing hollow glassware which comprises delivering a predetermined volume of air to a parison at a relatively rapid rate of flow to expand the parison quickly into a bulbous configuration approximating that of the mold and into a position in which all portions of the parison are disposed adjacent to the walls of the mold and at a substantially uniform distance therefrom and thereafter delivering air to the parison at a decreased rate of flow to expand all portions of the parisons uniformly into substantially simultaneous contact with the walls of the mold.

6. The combination with a glass shaping mold and cooperating blowhead of means for delivering a volume of air to said blowhead at a relatively rapid rate of flow to expand a parison quickly into a bulbous configuration approximating that of the mold, and means for subsequently delivering air to said blowhead at a decreased rate of flow to blow the parison to final form.

7. The combination with a glass shaping mold and cooperating blowhead of means for delivering a predetermined volume of air to said blowhead at a relatively rapid rate of flow to expand a parison quickly into a bulbous configuration approximating that of the mold and into a position adjacent to the walls of the mold, and means for subsequently delivering blowing air to the blowhead at a decreased rate of flow to expand all portions of the parison uniformly into substantially simultaneous contact with the walls of the mold.

8. The combination with a glass shaping mold and cooperating blowhead of means for delivering a predetermined volume of air to said blowhead at a relatively rapid rate of flow to expand a parison quickly into a bulbous configuration approximating that of the mold and into a position adjacent to the walls of the mold, means for subsequently delivering blowing air to the blowhead at a decreased rate of flow to expand all portions of the parison uniformly into a substantially simultaneous contact with the walls of the mold, and means for varying the volume of the air initially delivered to the blowhead.

9. The combination with a glass shaping mold and cooperating blowhead of means for delivering a predetermined volume of air to said blowhead at a relatively rapid rate of flow to expand a parison quickly into a bulbous configuration approximating that of the mold and into a position adjacent to the walls of the mold, means for subsequently delivering blowing air to the blowhead at a decreased rate of flow to expand all portions of the parison uniformly into substantially simultaneous contact with the walls of the mold, and means for varying the rate of flow of the air initially delivered to the blowhead.

10. The combination with a glass shaping mold and cooperating blowhead of means for delivering a predetermined volume of air to said blowhead at a relatively rapid rate of flow to expand a parison quickly into a bulbous configuration approximating that of the mold and into a position adjacent to the walls of the mold, means for susequently delivering blowing air to the blowhead at a decreased rate of flow to expand all portions of the parison uniformly into substantially simultaneous contact with the walls of the mold, and means for varying the volume and the rate flow of the air initially delivered to the blowhead.

11. The combination with a glass shaping mold and cooperating blowhead, of a source of air under relatively high pressure, a pressure accumulating chamber, means including a relatively restricted continuously open passage for establishing communication between said source and the system including said blowhead and said chamber, a valve for interrupting communication between said blowhead and both said source and said chamber to cause air under said relatively high pressure to accumulate in said chamber, and means for opening said valve to permit the air in said chamber to flow unrestrictedly to said blowhead at a relatively rapid rate to impart a predetermined preliminary configuration to a parison in said mold.

12. The combination with a glass shaping mold and cooperating blowhead, of a source of air under relatively high pressure, a pressure accumulating chamber, means including a relatively restricted continuously open passage for establishing communication between said source and the system including said blowhead and said chamber, a valve for interrupting communication between said blowhead and both said source and said chamber, and means for opening said valve to permit the air in said chamber to flow unrestrictedly to said blowhead at a relatively rapid rate to impart a predetermined preliminary configuration to a parison in said mold and subsequently to permit air from said source to flow to said blowhead at a decreased rate to blow the parison to final form.

13. The combination with a glass shaping mold and cooperating blowhead, of a source of air under relatively high pressure, a pressure accumulating chamber, means including a relatively restricted continuously open passage for establishing communication between said source and the system including said blowhead and said chamber, a valve for interrupting communication between said blowhead and both said source and said chamber to cause air under said relatively high pressure to accumulate in said chamber, means for opening said valve to permit the air in said chamber to flow unrestrictedly to said blowhead at a relatively rapid rate to impart a predetermined preliminary configuration to a parison in said mold, and means for varying the volume of air delivered to said blowhead from said pressure chamber.

14. The combination with a glass shaping mold and cooperating blowhead, of a source of air under relatively high pressure, a pressure accumulating chamber, means including a continuously open regulating valve to restrict the flow for establishing communication between said source and the system including said blowhead and said chamber, a cut-off valve for interrupting communication between said blowhead and both said source and said chamber to cause air under pressure to accumulate in said chamber, and means for opening said cut-off valve to permit the air in said chamber to flow unrestrictedly to said blowhead at a relatively rapid rate to impart a predetermined preliminary configuration to a parison in said mold and subsequently to permit air from said source to flow to said blowhead at a decreased rate to blow the parison to final form, the rate of flow of the air subsequently delivered to said blowhead from said source being governed by said regulating valve.

15. The combination with a glass shaping mold and cooperating blowhead, of a source of air under pressure, a pressure chamber, a diaphragm in said chamber, a spring for yieldably resisting the flexing of said diaphragm, means for establishing communication between said blowhead, said chamber and said source including a continuously open but adjustably restricted passage between said source and said chamber, a valve for interrupting communication between said blowhead and both said source and said chamber to cause air under pressure to accumulate in said chamber, and means for opening said valve to permit the air in said chamber to flow to said blowhead at a relatively rapid rate to impart a predetermined preliminary configuration to a parison in said mold.

16. The combination with a glass shaping mold and cooperating blowhead, of a source of air under pressure, a pressure chamber, means for establishing communication between said blowhead, said chamber and said source, a valve for interrupting communication between said blowhead and both said source and said chamber to cause air under pressure to accumulate in said chamber, means for opening said valve to permit the air in said chamber to flow to said blowhead at a relatively rapid rate to impart a predetermined preliminary configuration to a parison in said mold, and means for varying the capacity of said chamber.

17. The combination with a glass shaping mold and cooperating blowhead, of a source of air under pressure, a pressure chamber, means for establishing communication between the blowhead, said chamber and said source, a valve for interrupting communication between said blowhead and both said source and said chamber to cause air under pressure to accumulate in said chamber, means for opening said valve, to permit the air in said chamber to flow to said blowhead at a relatively rapid rate to impart a predetermined preliminary configuration to a parison in said mold and subsequently to permit air from said source to flow to said blowhead at a decreased rate to blow the parison to final form, and means located between said source and both said chamber and said blowhead for controlling the rate of flow of the air subsequently delivered to said blowhead.

Signed at Hartford, Connecticut, this 19th day of October, 1925.

ROBERT W. CANFIELD.